US009260822B2

(12) United States Patent
Friedman et al.

(10) Patent No.: US 9,260,822 B2
(45) Date of Patent: Feb. 16, 2016

(54) STABILIZING AGENTS AND METHODS OF USE THEREOF

(71) Applicant: AggreBind Inc., New Haven, CT (US)

(72) Inventors: Robert D. Friedman, New Haven, CT (US); Donald Hawkridge, Church Broughton (GB)

(73) Assignee: AggreBind Inc., New Haven, CT (US)

( * ) Notice: Subject to any disclaimer, the term of this patent is extended or adjusted under 35 U.S.C. 154(b) by 0 days.

(21) Appl. No.: 14/124,760

(22) PCT Filed: Feb. 28, 2013

(86) PCT No.: PCT/US2013/028445
§ 371 (c)(1),
(2) Date: Dec. 9, 2013

(87) PCT Pub. No.: WO2013/130898
PCT Pub. Date: Sep. 6, 2013

(65) Prior Publication Data
US 2014/0369749 A1    Dec. 18, 2014

Related U.S. Application Data

(60) Provisional application No. 61/604,258, filed on Feb. 28, 2012.

(51) Int. Cl.
*E01C 7/30* (2006.01)
*C08K 11/00* (2006.01)
*E02D 3/12* (2006.01)
*E01C 19/02* (2006.01)

(52) U.S. Cl.
CPC . *E01C 7/30* (2013.01); *C08K 11/00* (2013.01); *E01C 19/025* (2013.01); *E02D 3/12* (2013.01)

(58) Field of Classification Search
CPC ........... E01C 7/30; E01C 19/025; E02D 3/12; C08K 11/00
USPC .............................. 524/445, 442; 404/172, 72
See application file for complete search history.

(56) References Cited

U.S. PATENT DOCUMENTS

2005/0241529 A1* 11/2005 Partanen et al. ........ C08L 95/00
106/277

FOREIGN PATENT DOCUMENTS

WO        WO0032696        6/2000

OTHER PUBLICATIONS

Chemilink, Zero Waste Engineering, downloaded from the internet at www.chemilink.com on Sep. 16, 2014, 2 pages.
Enviroflo Engineering—Nalco Dust Control Chemicals, downloaded from the internet at http://www.envirofloeng.com/dustchem.html on Sep. 16, 2014, 2 pages.
Enviroseal, Soil Stabilizers-Dust Control-Sealers-Concrete-Brick-Wood-Asphalt, downloaded from the internet at http://www.enviroseal.com on Sep. 16, 2014, 2 pages.
(Continued)

*Primary Examiner* — Michael M Bernshteyn
(74) *Attorney, Agent, or Firm* — Dentons US LLP

(57) ABSTRACT

Among the various aspects of the present disclosure is the provision of a methods and compositions for the installation and formation of roads and construction materials. The use of base materials and stabilizing agent provide affordable roads and construction materials.

21 Claims, 12 Drawing Sheets

(56) References Cited

OTHER PUBLICATIONS

PowerCem Technologies, downloaded from the internet at http://www.powercemtechnologies.nl/en/ on Sep. 16, 2014, 2 pages.
Probase: Soil Road Stabilizer, downloaded from the internet at http://www.probase.com.my/usr/page.aspx?pgid=1 on Sep. 16, 2014, 3 pages.
Soilworks, Durasoil, downloaded from the internet at http://www.soilworks.com/products-and-services/durasoil on Sep. 16, 2014, 5 pages.
Soilworks, Gorilla-Snot, downloaded from the internet at http://www.soilworks.com/products-and-services/gorilla-snot on Sep. 16, 2014, 5 pages.
Soilworks, Soiltac, downloaded from the internet at http://www.soilworks.com/products-and-services/soiltac on Sep. 16, 2014, 6 pages.
New Zealand Office Action dated May 15, 2015 in related Application No. 629228 (2 pages).

* cited by examiner

FIG. 1A-D

FIG. 3
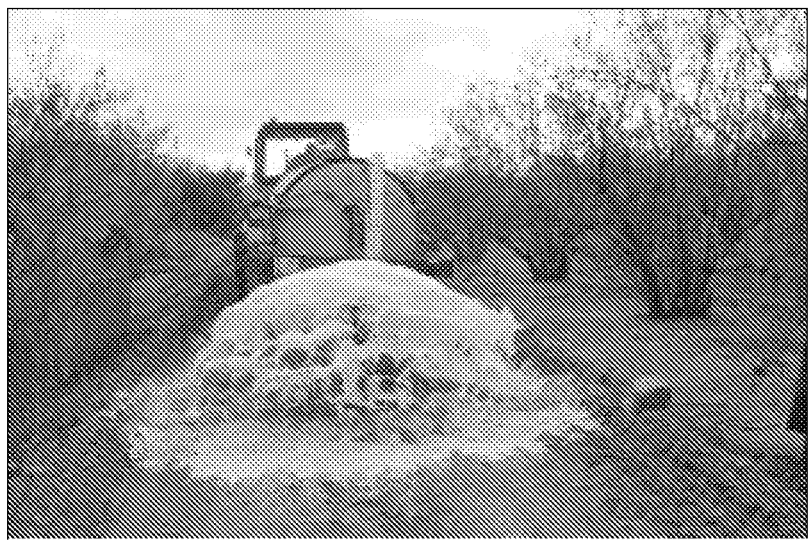
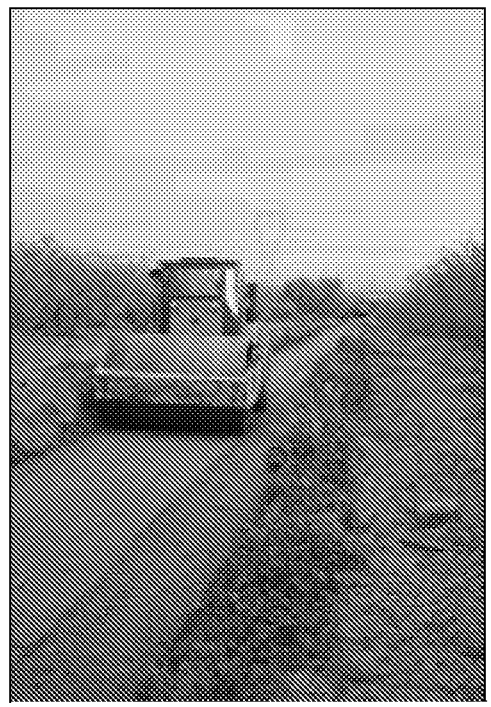

STABILIZING AGENTS AND METHODS OF USE THEREOF

CROSS-REFERENCE TO RELATED APPLICATIONS

This application claims the benefit of priority to PCT International Application No. PCT/US13/28445 filed on 28 Feb. 2013, which claims the benefit of U.S. Provisional Application Ser. No. 61/604,258 filed on 28 Feb. 2012, each of which are incorporated herein by reference in their entireties.

FIELD OF THE INVENTION

The present disclosure generally relates to methods and compositions for the construction of roads and construction materials using base materials and stabilizing agents.

BACKGROUND OF THE INVENTION

Building in developing countries can be expensive, and a more affordable option is needed. Using local, indigenous, and in situ materials (e.g., materials in the immediate area of the building site, materials on hand, local materials) may be necessary because the luxury of importing materials do not always exist. Affordable housing and roads are needed to safely and securely raise families. Roads are needed to move products to market, children to schools, and people to medical care facilities.

It has been shown that high clay content can be required for effective use of soil for road construction and building materials. But clay is not always available as a material. Previous methods have also demonstrated that many additives have little to no benefit for silty, sandy soil types (Newman et al., 2004). Sandy soil types have been problematic for stabilization and have often required cement or asphalt emulsion to provide soil cohesion.

Many roads currently being used in many countries are not paved. Such roads can consist of materials such as dirt, clay, sand, dust, etc. Rains can cause: erosion of the roads, road closures, wash-out of fine particles, formation of potholes, muddy soil, road failure and collapse, damage to vehicles, harm or death to humans, or environmental damage. Because of the issues caused by rain, the roads may become impassable, the surface may become rutted and damaged, pedestrian and bicycle movement may be restricted, produce and products may not be able to get to the market, any of which may result in financial loss to communities and damage to the local and regional economy. Dry conditions can cause issues with dust, resulting in danger to drivers and pedestrians. Dust can also cause numerous health problems. Dust can cause reduction in agricultural output and causes crop damage. Dirt and gravel roads can develop corrugations (e.g., a wash-board effect) that makes driving conditions hazardous and can cause damage to vehicles and products.

SUMMARY OF THE INVENTION

Among the various aspects of the present disclosure is the provision of methods and compositions for the installation and formation of roads and construction materials. The use of base materials and stabilizing agent provide affordable roads and construction materials.

Various methods and materials described herein can provide roads that can last as long or longer than a traditional road base, can be constructed about 5-10 times faster, and can produce about 3 to 5 times more road for the same cost.

One aspect provides a method of forming a surface or construction material. In some embodiments, the method includes the steps of: obtaining a stabilizing agent, obtaining a base material, and obtaining a solvent; combining the stabilizing agent, base material, and solvent to form a mixture; and compacting the mixture to form a surface or compacting the mixture to form a construction material; wherein, the stabilizing agent comprises a polymer.

Another aspect provides a method of forming a surface. In some embodiments, the method includes obtaining a stabilizing agent, obtaining a base material, and obtaining a solvent; combining the stabilizing agent, base material, and solvent to form a mixture; and compacting the mixture to form a surface; wherein, the stabilizing agent comprises a polymer.

Yet another aspect provides a method of forming a construction material. In some embodiments, the method includes obtaining a stabilizing agent, obtaining a base material, and obtaining a solvent; combining the stabilizing agent, base material, and solvent to form a mixture; and compacting the mixture into the mold to form a construction material; wherein, the stabilizing agent comprises a polymer.

Yet another aspect provides a composition including a stabilizing agent, a base material, and a solvent; or a cured stabilizing agent and a base material; wherein, the stabilizing agent comprises a polymer; and the stabilizing agent and base material are uniformly mixed throughout the composition.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 3A is a photograph of a bowser applying the stabilizing agent.

FIG. 3B is a photograph of a roller compactor.

DETAILED DESCRIPTION OF THE INVENTION

Figure 1:
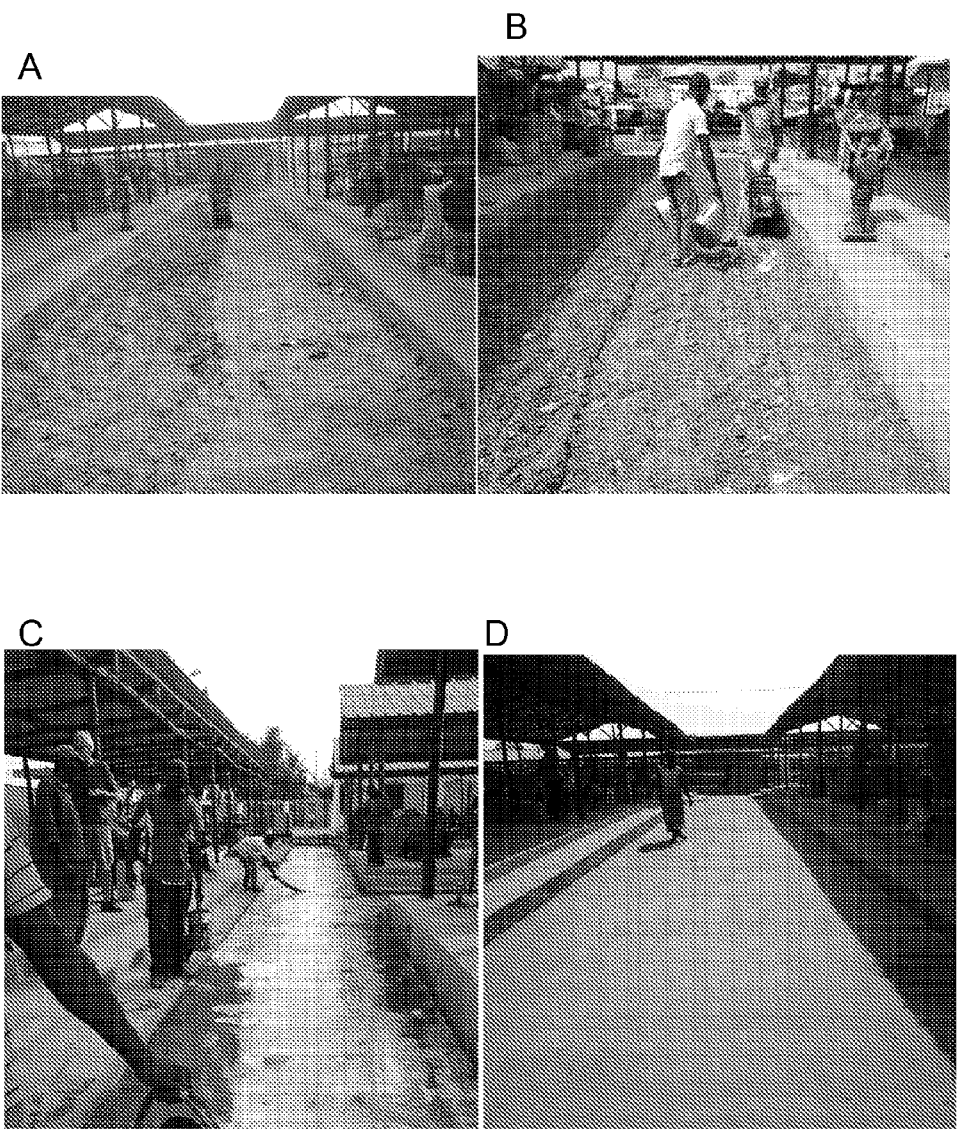
FIG. 1A is a photograph of preparing in situ soil by mechanically breaking down the in situ soil between pavillions.
FIG. 1B is a photograph of the manual application of the stabilizing agent to the prepared in situ soil and the mechanical blending of the stabilizing agent mixture into the soil.
FIG. 1C is a photograph of the application of a top seal of stabilizing agent.
FIG. 1D is a photograph of the finished cured road.

The present disclosure is based, at least in part, the discovery that stabilizing agents can be used with base materials to form roads and construction materials easily and affordably. Because there was a lack of rudimentary housing and passable roads, an inexpensive composition and method was invented to provide inexpensive roads and construction materials.

Provided herein are compositions and methods for installation of roads and forming of construction materials with base materials and stabilizing agents.

Surfaces, Roads, and Other Applications

As described herein, a surface, such as a traversable surface (e.g., a road or other similar traversable surface), can be constructed from a base material and a stabilizing agent. While discussion below recites road, one of ordinary skill will understand that the disclosure can apply equally to any other type of traversable surface.

Construction, installation, and production of roads are well-known within the art. Except as otherwise noted herein, therefore, the methods and compositions of the present disclosure can be carried out in accordance with such conventional processes.

A road can be any traversable surface leading from one place to another. For example, a road can be a way, path, route, street, pathway, track, roadway, or walkway. For example, a road can be used as a means to delineate properties or areas. For example, a road can be used in golf courses, shopping malls, theme parks, and other recreation parks (e.g., skate parks, water parks). A road can be used for foot traffic, animal traffic, bicycle traffic, airport landing strips, or vehicular traffic, or for a delineation of areas, to show, for example, boundaries.

A road or surface described herein can include polymers or other additives that provide the road or surface with water-resistant characteristics, which can be desirable or necessary in wet or potentially wet environments (e.g., water parks, gardens, heavy seasonal rain).

A road or surface described herein can be a colored road or surface. A colored road or surface can be any color, such as black, green, blue, red, etc. The choice of colors may be limited to the availability of water-based colorants where, for example, a water based solvent is desired or necessary. A water-based colorant suitable for use in a road or surface described herein can be obtained from a variety of commercial sources (e.g., Northwest Dispersion, Ltd, UK; see Examples). A colored road or surface can be of a consistent color through a partial or entire depth or surface of the road. A colored road or surface can include multiple colors in a striated or layered pattern through a partial or entire depth or surface of the road. For example, multiple colors in a striated or layered pattern can be used as a wear indicator for a road or surface.

A road or surface described herein can include a stabilizing agent, a base material, and a waste material. Such components are described in greater detail herein.

A natural colored road or surface can be advantageous if the surface is desired or necessarily to be camouflaged, hidden, or blended into the surroundings.

Colored roads can be advantageous, for example, in conditions where ity is desirable or necessary for the road to be colorful or have enhanced visibility. For example, where a road is other than a "natural" color or the color of the base material, a dangerous object (e.g., an explosive device or improvised explosive device (IED)) can be more easily detected thereby providing improved detection of possible danger. Further advantages of the colored roads include the increased visibility of potholes or other damage.

The above discussion applies equally to other surfaces constructed from a base material and a stabilizing agent. For example, such surfaces can include, without limitation, a foundation, reservoir, embankment, lining of drainage channels, weed growth suppression lining, bridleways, animal tracks, yards, equestrian centers, golf course lining, lining for fish farming, lining for seafood farming, or pond lining.

Construction Materials

As described herein, construction materials can be prepared using base materials and stabilizing agents. A construction material can be, for example, any modular building unit produced and used in assemblage of a physical structure (e.g., a building structure or a non-building structure; or building structures, architectural structures, civil engineering structures, or mechanical structures). For example, a construction material can include a brick. As another example, a construction material can include a block. As another example, a construction material can include a paver. As another example, a construction material can include a decorative surface. As another example, a construction material can include tile. As another example, a construction materials can be a block, brick, or paver. As another example, a construction materials can be a decorative surface or tile.

Production processes for construction materials (including bricks, blocks, pavers, free standing blocks, and other surfaces (BBP)) are well known. Except as otherwise noted herein, therefore, the methods and compositions of the present disclosure can be carried out in accordance with such processes.

Construction materials, such as BBPs, can be used to build roads. Construction materials can be used as building materials for assemblage of, for example, building structures, architectural structures, civil engineering structures, or mechanical structures. Construction materials, such as BBPs, can be used as decorative surfaces or tiles. Construction materials, such as blocks or bricks, can be according to Example 1 and Example 2 and used for structures such as building structures, architectural structures, civil engineering structures, or mechanical structures. Buildings can include, without limitation, structures such as free standing structures, vertical structures, walls, roads, homes, businesses, bases, installations, storage, shelters, embankment/bund construction, dams, levees, etc.

Construction materials can include polymers or other additives that provide the construction materials with water-resistant characteristics, which can be desirable or necessary in wet or potentially wet environments (e.g., water parks, gardens, heavy seasonal rain). A construction material described herein can be a colored construction material. A colored construction material can be any color, such as black, green, blue, red, etc. The choice of colors may be limited to the availability of water-based colorants where, for example, a water based solvent is desired or necessary. A water-based colorant suitable for use in a construction material described herein can be obtained from a variety of commercial sources (e.g., Northwest Dispersion, Ltd, UK; see Examples). A colored construction material can be of a consistent color through a portion of or all of the construction material. A consistent color throughout a construction material can allow for alteration of the construction material (e.g., to fit in certain spaces) while preserving a uniform color. A colored construction material can include multiple colors in a striated or layered pattern through all or part of the construction material. For example, multiple colors in a striated or layered pattern can be used as a wear or damage indicator for a construction material or a structure made from such construction material.

A colored construction material incorporated in or on a building can be advantageous in conditions where it is desired or necessary that a building be camouflaged, concealed, or colorful, such as in conflicts or times of war. For example, where a construction material is other than a "natural" color (or the color of the base material or waste material), a dangerous object (e.g., an explosive device or an improvised explosive device (IED)) can be more easily detected, thereby providing improved detection of possible danger.

Further, a colored building material can create an aesthetically pleasing color for a building, such as a home or residence. For example, a colored building material can be incorporated into or on a low-cost social housing structure so as to foster inhabitants' sense of pride and identity.

A construction material can be an approved construction material. For example, a construction material such as hand or mechanically compacted bricks can be approved for use for vertical/house construction. A construction material composed of a base material and a stabilizing agent can be hand compacted or mechanically compacted.

Hand compacted construction materials as described herein can achieve strengths of about 1 daN to 20 daN, or more. For example, hand compacted construction materials can achieve strengths of about 11 daN to 20 daN. For example, hand compacted construction materials can achieve strengths of at least about 1 daN, at least about 2 daN, at least about 3 daN, at least about 4 daN, at least about 5 daN, at least about 6 daN, at least about 7 daN, at least about 8 daN, at least about 9 daN, at least about 10 daN, at least about 11 daN, at least about 12 daN, at least about 13 daN, at least about 14 daN, at least about 15 daN, at least about 16 daN, at least about 17 daN, at least about 18 daN, at least about 19 daN, at least about 20 daN, at least about 21 daN, at least about 22 daN, at least about 23 daN, at least about 24 daN, at least about 25 daN, at least about 26 daN, at least about 27 daN, at least about 28 daN, at least about 29 daN, at least about 30 daN, at least about 31 daN, at least about 32 daN, at least about 33 daN, at least about 34 daN, at least about 35 daN, at least about 36 daN, at least about 37 daN, at least about 38 daN, at least about 39 daN, at least about 40 daN, at least about 50 daN, at least about 60 daN, at least about 70 daN, or more.

In some embodiments, hand compacted blocks using local soils with little or no clay content and a stabilization agent (e.g., AggreBind©) can achieve strengths of 11 daN to 20 daN, or more.

Mechanically compacted construction materials as described herein can achieve strengths of at least about 1 daN to 22 daN, or more. For example, mechanically compacted construction materials as described herein can achieve strengths of at least about 17 daN to 22 daN. For example, mechanically compacted construction materials can achieve strengths of at least about 1 daN, at least about 2 daN, at least about 3 daN, at least about 4 daN, at least about 5 daN, at least about 6 daN, at least about 7 daN, at least about 8 daN, at least about 9 daN, at least about 10 daN, at least about 11 daN, at least about 12 daN, at least about 13 daN, at least about 14 daN, at least about 15 daN, at least about 16 daN, at least about 17 daN, at least about 18 daN, at least about 19 daN, at least about 20 daN, at least about 21 daN, at least about 22 daN, at least about 23 daN, at least about 24 daN, at least about 25 daN, at least about 26 daN, at least about 27 daN, at least about 28 daN, at least about 29 daN, at least about 30 daN, at least about 31 daN, at least about 32 daN, at least about 33 daN, at least about 34 daN, at least about 35 daN, at least about 36 daN, at least about 37 daN, at least about 38 daN, at least about 39 daN, at least about 40 daN, at least about 50 daN, at least about 60 daN, at least about 70 daN, or more.

In some embodiments, mechanically compacted blocks using local soils with little or no clay content and a stabilization agent (e.g., AggreBind©) can achieve strengths of 17 daN to 22 daN, or more.

Stabilizing Agents

As described herein, stabilizing agents can be combined with a base material so as to form a surface or construction material. A stabilizing agents can be a soil stabilizing agent. Various stabilizing agents that may be used in accordance with the present disclosure are well-known in the art, are commercially available, or have well-known synthesis (see e.g., Ramaji et al., J App Sci Res, 2012, 8(4), 2193-2196; Lutzow et al., E J Soil Sci, 2006, 57, 426-445).

A stabilizing agent can be a polymer. For example, stabilizing agents can be, without limitation, natural polymers, synthetic polymers, polymer emulsions, polymerized acids, lignin derivatives, polymerized enzymes, tree resin emulsions, and polymerized silicates. As another example, stabilizing agents can be, without limitation, cement, lime, fly ash, asphalt emulsion, acids, enzymes, and silicates. Conventional use of asphalt emulsions, such as with recycling equipment to perform "cold-mix" recycling to rehabilitate deteriorated pavements, can be adapted for use with methods or compositions described herein.

A polymer can be a combination of a large number of similar small molecules or monomers into large molecules or polymers. A polymer can be composed of connected monomers, a plurality of monomers with the potential to be connected, or a combination thereof. A polymer can be a copolymer. A polymer can have properties different than or similar to the monomer. Naturally occurring polymers include, but are not limited to, organic or mineral polymers, rubber, and polymeric sulfur. For example, bitumen can be a polymer due to the long-chain comprised in bitumen.

Other examples of polymers of a stabilizing agent include thermoplastic rubbers, styrene butadiene styrene, ethylene vinyl acetate, styrene acrylic polymer, acrylic vinyl acetate copolymer, polyethylene-vinyl acetate co polymer, acrylic copolymer, polymeric inorganic acrylic copolymer, acrylic vinyl acetate copolymer, and acrylic polymer. Various polymers that can be used in accord with compositions and methods described herein, such as vinyl, acrylic, or acrylate polymers, are well known in the art, are commercially available, or have well-known synthetic procedures.

For example, polymers of a stabilizing agent can be a styrene acrylic polymer (e.g., AggreBind©, UK). A styrene acrylic polymer can be cross-linking, water-based, or environmentally friendly.

As another example, polymers of a stabilizing agent can be a copolymer comprising styrene and acrylic units.

Natural polymers can include lignin and tree resin. For example, a natural polymer for use in composition or methods described herein can be a lignosulfonate (e.g., Toranil™, desugared calcium lignosulfonate), which dissolves in water. Tree resin, also known as mineral pitch, can also be used as a stabilizing agent. Other polymers for use in or with stabilizing agents include polyacrylamide (PAM) polymers, polyacrylamide and poly(acrylic acid) random co-polymer. Other commercially available stabilizing agents containing a polymer include Soilworks® or DirtGlue™. A polymer for use in or with a stabilizing agent can be an aluminum hydroxide (Al(OH)$_{2.5}$Cl$_{0.5}$), where the polymer is a chain of seven hexagonal rings with the chemical formula [Al$_{24}$(OH)$_{60}$(H$_2$O)$_{24}$]$^{18+}$. A polymer for use in or with a stabilizing agent can be calcium acrylate. A polymer for use in or with a stabilizing agent can be an acrylic polymer. Another commercially available stabilizing agents containing a polymer include Soil Seal®. Acetylene can be the result of calcium carbide reacting with water. A polymer for use in or with a stabilizing agent can be acetylene. Acetylene can be used as a source of hydrocarbon, which when combined with an appropriate radical, can produce in-situ polymerization within the soil.

Use of a stabilizing agent, such as a polymer-containing stabilizing agent, can involve a polymer emulsion comprised of the polymer and a liquid, where the liquid is diluted to a suitable amount. A dilution amount can be selected to achieve a target additive quantity at a desired moisture content desired or required for efficient compaction of a base material. A polymer emulsion can be a class of material in which the polymer is generally manufactured in the emulsion state. A polymer emulsion can represent a wide-range of materials including, but not limited to, styrene-butadiene random copolymers (synthetic rubber), polyvinyl chloride (PVC), and other types of acrylic-based polymers (e.g., as employed in paints). A polymer emulsion may not require a solvent carrier, can be easily cleaned up using water/detergent, or, for many polymers, may not pose an environmental concern when used in bulk.

Polymer emulsions can have a wide range of properties. A polymer emulsion ionic state can be anionic, cationic, or non-ionic. A polymer emulsion may be acidic, basic, or neutral pH. A polymer emulsion solids content may vary. An exemplary polymer emulsion can contain about 40% to about 45% polymer, about 1% to about 2% emulsifier with the balance being a solvent, such as water (e.g., potable water). The polymer can also be variable in its chemistry (i.e., styrene-butadiene or polyethylene-vinyl acetate), molecular weight, degree of branching, side-chain size or composition, etc. A polymer of a stabilizing agent can have physical properties such as high tensile, flexural, or compressive strengths, desirable or necessary adhesion to soil particles, or increased or enhanced resistance to water, chemical, or ultraviolet effects. Examples of a polymer for a stabilizing agent include, but are not limited to, vinyl acetate or acrylic-based copolymers.

A polymer for a stabilizing agent, as described herein, can have a unique ability to "bond back to itself"; cross-link; provide a permanent bond, free or substantially free from substantial delaminating or substantial separation; have the properties or strength to substantially retain polymer impregnated stone chippings (e.g., 2-4 mm) into the surface prior to compaction or final compaction and thus provide acceptable, desirable, or necessary slip/grip polished stone value (PSV) resistance (PSV is a standard test for grip on a road surface); have the ability to seal or bind non-regular aggregate materials or bind/seal it with base material (e.g., soil), such non-regular aggregate materials include (but are not limited to) crushed glass, rubber crumb, construction waste, non-organic municipal waste (e.g., after extraction of green waste, metals, or other recyclable materials); have penetration capabilities from surface spray application; bind or seal the surface to contain dust or prevent the ingress of surface water; a viscosity, penetration, sealing or encapsulating capability to contain low level radiation or heavy metals being emitting into the air or can seal the surface to reduce or eliminate surface water penetration from percolation into a subpart of the base material (e.g., a subsoil); seal, making inert, or re-aligning particles of clay (e.g., such that they become inert) or used within base materials having a high clay content or be compatible with the polymers in binding and sealing into a stabilized base material layer (e.g., a stabilized soil layer); have properties of, once cured, being irreversible and thus the integrity of the product can be retained indefinitely; have the capability of retaining their properties, or are able to be reworked to bond and seal the soil without any significant or substantial loss of strength or water resistant properties under environmental conditions, such as rain; have soil lubrication properties that, when used with a well graded base material (e.g., soil) mixture, can produce compaction results of about 95 to about 97 Proctor (Proctor is a standard compression test in the construction industry).

A stabilizing agent can be supplied as an aqueous concentrate. A stabilizing agent can be diluted according to, for example, about 1 part stabilizing agent to about 1 to about 100 parts solvent. For example, a stabilizing agent can be diluted according to about 1 part stabilizing agent to about 4 parts solvent. As another example, the 1 part stabilizing agent can be diluted to at least about 1 part solvent, at least about 2 parts solvent, at least about 3 parts solvent, at least about 4 parts solvent, at least about 5 parts solvent, at least about 6 parts solvent, at least about 7 parts solvent, at least about 8 parts solvent, at least about 9 parts solvent, at least about 10 parts solvent, at least about 15 parts solvent, at least about 20 parts solvent, at least about 25 parts solvent, at least about 30 parts solvent, at least about 35 parts solvent, at least about 40 parts solvent, at least about 45 parts solvent, at least about 50 parts solvent, at least about 55 parts solvent, at least about 60 parts solvent, at least about 65 parts solvent, or more.

A stabilizing agent can be used as described herein as an aqueous solution. A stabilizing agent can be used, for example, at the equivalent of about 1 L to about 50 L concentrated aqueous stabilizing agent per cubic meter of base material. For example, a stabilizing agent can be used at the equivalent of about 4 L concentrated aqueous stabilizing agent per cubic meter of base material. As another example, the stabilizing agent can be applied at least about 1 L, at least about 2 L, at least about 3 L, at least about 4 L, at least about 5 L, at least about 6 L, at least about 7 L, at least about 8 L, at least about 9 L, at least about 10 L, at least about 11 L, at least about 12 L, at least about 13 L, at least about 14 L, at least about 15 L, at least about 16 L, at least about 17 L, at least about 18 L, at least about 19 L, at least about 20 L, at least about 25 L, at least about 30 L, at least about 35 L, at least about 40 L, at least about 45 L, at least about 50 L, or more equivalent concentrated stabilizing agent.

A stabilizing agent can be used as described herein as a solid or in a solution. A stabilizing agent can be combined with a base material by weight or volume of at least about 0.01% to less than about 100% of the base material. For example, a stabilizing agent can be combined with a base material by weight or volume at least about 0.01%, at least about 0.05%, at least about 0.1%, at least about 0.5%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, at least about 40%, at least about 41%, at least about 42%, at least about 43%, at least about 44%, at least about 45%, at least about 46%, at least about 47%, at least about 48%, at least about 49%, at least about 50%, at least about 51%, at least about 52%, at least about 53%, at least about 54%, at least about 55%, at least about 56%, at least about 57%, at least about 58%, at least about 59%, at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99%, or less than about 100%.

Base Material

As described herein, a base material can be combined with a stabilizing agent to form a surface (e.g., a traversable surface, such as a road) or a construction material. A base material can be any material available suitable to form a portion fo the surface or construction material. A base material can be used, for example, in the construction or installation of roads; surfaces; or construction materials including blocks, bricks, pavers, or other surfaces (BBPs) as described herein.

A base material can be an in situ material or an imported material. For example, a base material can include an in situ, local, or indigenous material. As another example, a base material can include an imported material.

A base material can include soil, sand, silt, humus, volcanic soil, peat, loam, or clay. A base material can be a waste material, as described further herein. A base material can include a cement. A base material can include an aggregate such as angular stone, fines, clay, volcanic, pumice, or sand. A base material can be a mixture of any aforesaid component, such as sand, silt, or clay. A base material can include an organic material. A base material can include limestone, granite, trap rock, sandstone, basalt, diabase rock, gabbro, sand or gravel, or a combination thereof.

As described herein, base material composition can compose less than about 100% by weight or volume of the surface material (e.g., traversable surface material) or construction material.

For example, a base material can compose by weight or volume at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, at least about 40%, at least about 41%, at least about 42%, at least about 43%, at least about 44%, at least about 45%, at least about 46%, at least about 47%, at least about 48%, at least about 49%, at least about 50%, at least about 51%, at least about 52%, at least about 53%, at least about 54%, at least about 55%, at least about 56%, at least about 57%, at least about 58%, at least about 59%, at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99%, or less than about 100% of the total weight or volume of the surface material or construction material.

As described herein, fines percentage in a base material can be used to obtain an desirable, necessary or optimum strength and durability or estimate strength and durability. Fines percentages in a base material can be at least about 1% up to about 100%. For example, fines percentages in a base material can be at least about 30% to 35% to obtain desirable, necessary or optimum strength and durability. For example, percentage of fines in a base material can be at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or about 100%.

As described herein, the fines can be measured through a sieve to determine fines content. A sieve can be at least about 0.01 to about 0.25 mm. For example, sieve can be at least about 0.063 to about 0.07 mm to obtain desirable, necessary or optimum strength and durability. of about 0.63-0.7 mm. For example, sieve size can be at least about 0.01 mm, at least about 0.02 mm, at least about 0.03 mm, at least about 0.04 mm, at least about 0.05 mm, at least about 0.06 mm, at least about 0.07 mm, at least about 0.08 mm, at least about 0.09 mm, at least about 0.1 mm, at least about 0.11 mm, at least about 0.12 mm, at least about 0.13 mm, at least about 0.14 mm, at least about 0.15 mm, at least about 0.16 mm, at least about 0.17 mm, at least about 0.18 mm, at least about 0.19 mm, at least about 0.20 mm, at least about 0.21 mm, at least about 0.22 mm, at least about 0.23 mm, at least about 0.24 mm, at least about 0.25 mm, or more.

A base material, as used herein, can include a soil. Soil is understood to be a natural body consisting of layers (soil horizons) that are primarily composed of minerals which differ from their parent materials in their texture, structure, consistency, color, chemical, biological or other characteristics. Soil is understood to include the unconsolidated or loose covering of fine rock particles that covers the surface of the earth. Soil is understood to be an end product of the influence of the climate (temperature, precipitation), relief (slope), organisms (flora and fauna), parent materials (original minerals), and time. In engineering terms, soil can be referred to as regolith, or loose rock material that lies above the 'solid geology'. In horticulture, soil can be defined as the layer that contains organic material that influences and has been influenced by plant roots and may range in depth from centimeters to many meters. Soil is understood to be a mixture of mineral and organic materials in the form of solids, gases and liquids. Soil is commonly referred to as earth or dirt, though dirt can be understood as displaced soil.

Physical properties of soils include texture, structure, density, porosity, consistency, temperature, color and resistivity. A base material can include a soil with a combination of these physical properties. Soil texture depends on relative proportion of three kinds of soil particles, i.e., soil separates: sand, silt, and clay. A base material can include a mixture of sand, silt, or clay. Peds are larger soil structures created from soil separates when iron oxides, carbonates, clay, or silica with the organic constituent humus, coat particles and cause them to adhere into larger, relatively stable secondary structures. A base material can include a soil with a ped secondary structure, such as platy, prismatic, columnar, angular, subangular, blocky, granular, or crumb. Soil density, particularly bulk density, is a measure of soil compaction. Soil porosity consists of the part of the soil volume occupied by air and water. Consistency is the ability of soil to stick together. Soil temperature and (natural) color are usually self-defining but can be modified with additives. Resistivity refers to the resistance to conduction of electric currents and affects the rate of corrosion of metal and concrete structures. A soil of a base material can have differing combinations of the above physical properties.

A base material can include a crystalline clay or an amorphous clay. A base material can include clay-like soil minerals, such as gypsum, carbonates, or quartz. A base material can include crystalline alumino-silica clays, such as montmorillonite, illite, vermiculite, chlorite, or kaolinite. A base material can include amorphous clays, such as young mixtures of silica ($SiO_2$—OH) and alumina ($Al(OH)_3$) which have not had time to form regular crystals. A base material can include sesquioxide clays, such as old, highly leached clays which result in oxides of iron, aluminum and titanium.

A base material can include rock. Rock is understood to be a parent material or component of soil. A base material can include particles of broken rock (parent materials) which have been altered by physical, chemical and biological processes that include weathering (disintegration) with associated erosion (movement).

A base material can include a dry soil (e.g., loose, soft, hard, extremely hard); a moist soil (e.g., loose, friable, firm, extremely firm); a wet soil (e.g., non-sticky, sticky or non-plastic, plastic); or a cemented soil (e.g., weakly cemented, indurated). Soil consistency can be useful in estimating the ability of soil to support buildings or roads.

A base material can include an alfisol soil, an andisol soil, an aaridisol soil, an entisol soil, a gelisol soil, a histosol soil, an Inceptisol soil, a mollisol soil, an oxisol soil, a spodosol soil, aultisol soil, a vertisol soil, or a mountain soil.

Each of the described conventional definitions and understandings of soil (and components thereof) are included in the meaning of the term as used herein, including a soil or soil component of a base material.

A base material including soil can contain pore spaces and mixture of solids, water, and gases. Soil of a base material can have, for example, a density between about 1 $g/cm^3$ and about 2 $g/cm^3$.

Soil of a base material can be composed of, for example, about 45% minerals (sand, silt, clay), about 25% water, about 25% air, and about 5% organic material. Mineral or organic components of soil can be relatively constant while the percentages of water and air can be variable parameters where the increase in one is balanced by the reduction in the other.

Mineral content of soil of a base material can be about 1% to about 100%. For example, mineral content of soil of a base material can be about 45%. As another example, mineral content of soil of a base material can be about at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or about 100%.

Water content of soil of a base material can be about 1% to less than about 100%. For example, water content of soil of a base material can be about 25%. As another example, water content of soil of a base material can be about at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100%.

Air content of soil of a base material can be about 1% to less than about 100%. For example, air content of soil of a base material an be about 25%. As another example, to air content of soil of a base material can be at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100%.

Organic content of soil of a base material can be about 1% to less than about 100%. For example, organic content of soil of a base material can be about 5%. For example, organic content of soil of a base material can be about at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100%.

A base material can include soil from one or more soil horizons (e.g., A, B, or C horizons). Over time, a simple mixture of sand, silt, and clay can evolve into a soil profile which consists of two or more layers called horizons that differ in one or more properties such as texture, structure, color, porosity, consistency, and reaction. Horizons can differ greatly in thickness and generally lack sharp boundaries.

A base material can include rock (e.g., igneous, sedimentary, or metamorphic rock). Mineral content of rock of a base material can include, for example, quartz ($SiO_2$); calcite ($CaCO_3$); feldspar ($KAlSi_3O_8$); mica or biotite $(K(Mg,Fe)_3 AlSi_3O_{10}(OH)_2)$.

A base material can include sand, silt, clay, loam, or rock. Sand of a base material can include rock fragments (e.g., quartz particles) ranging in size from about 2.0 to about 0.05 mm in diameter. Silt of a base material can include particles ranging in size from about 0.05 to about 0.002 mm in diameter. Clay of a base material can include particles less than about are 0.002 mm in diameter.

A base material can include rock (e.g., igneous, sedimentary, or metamorphic rock). Mineral content of rock of a base material can include, for example, quartz ($SiO_2$); calcite ($CaCO_3$); feldspar ($KAlSi_3O_8$); mica or biotite $(K(Mg,Fe)_3 AlSi_3O_{10}(OH)_2)$. A base material can include rock or gravel having a size of greater than about 2.0 mm in diameter A base material can include an organic component of a soil (e.g., an organic soil).

A base material can include a soil of a certain particle density or range thereof (see e.g., Table 1).

TABLE 1

Representative bulk densities of soils. The percentage pore space was calculated using 2.7 g/cc for particle density except for the peat soil, which is estimated.

| Soil treatment and identification | Bulk density g/cc | Pore space % |
|---|---|---|
| Tilled surface soil of a cotton field | 1.3 | 51 |
| Trafficked inter-rows where wheels passed surface | 1.67 | 37 |
| Traffic pan at 25 cm deep | 1.7 | 36 |
| Undisturbed soil below traffic pan, clay loam | 1.5 | 43 |
| Rocky silt loam soil under aspen forest | 1.62 | 40 |
| Loamy sand surface soil | 1.5 | 43 |
| Decomposed peat | 0.55 | 65 |

A base material can include organic matter, such as Raw organic matter, humus (e.g., containing humic acid or fulvic acid), lignin, or living organisms (e.g., plants, insects, bacteria or fungi)

A soil for use in or as a base material can be derived from, for example, the mining and construction industries. For example, soil for use in or as a base material can be derived from volumes of soil involved in surface mining, road building or dam construction.

Waste Material

As described herein, a waste material can be included in a base material.

A waste materials can be used in the construction or installation of roads, surfaces, or construction materials including blocks, bricks, pavers, or other surfaces (BBPs). Waste materials can be a major component of a base material or an additive thereto. The water-encapsulating properties of the stabilizing agent can render hazardous material non-hazardous, disposing the materials in a non-hazardous manner. For example, waste materials can be inorganic waste, organic waste, scrap tire, recycled material, recycled asphalt, recycled cement, nut shells, peat, organic material, fly ash, oil impregnated sand, tar sand, construction waste, mine waste, roofing shingles, plastic, crushed glass, fiber glass, rubber crumb, non-organic municipal waste, material found in polluted areas, or materials from lag storage tanks. For example, plastic waste materials can include: PET, polyethylene terphthalate, from 2-1 soda bottles; HDPE, high density polyethylene, natural, from 1 gallon milk jugs, grocery bags; HDPE, high density polyethylene, colored, from bottles; PVC, polyvinyl chloride, various bottle, pipes, flooring; LDPE, low density polyethylene, from film and trash bags, rigid containers; PP, polypropylene, from some food containers, battery cases, medical containers; and PS, polystyrene, from carry-out containers, some food containers, vitamin bottles.

The waste materials can be incorporated in any of the materials discussed in Example 1, Example 2, and Example 3.

Waste materials can be a component of a base material as described herein. A waste materials can be, by weight or volume, at least about 1% to less than about 100% of a base material. For example, a waste materials can be, by weight or volume, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100% of a base material.

Solvent

As described herein, a solvent can be combined with a stabilizing agent and a base material to form a surface (e.g., a traversable surface) or a construction material. A solvent can be a water based solvent. As described herein, a solvent can be pre-mixed with a stabilizing agent or provided separately. A solvent can include water. A solvent can be, for example, water, mud, recycled water, gray water, salt water, fresh water, purified water, fresh water, sea water, or brackish water. The solvent can be local, pumped supplies, or transported in.

The volume of solvent used can depend on the moisture content of the base material. The volume of solvent can be, for example, about 1 L to 100 L per cubic meter of base material. As another example, the volume of solvent can be about 20 L to 48 L per cubic meter of base material. As another example, the volume of solvent per cubic meter of soil can be at least about 1 L, at least about 2 L, at least about 3 L, at least about 4 L, at least about 5 L, at least about 6 L, at least about 7 L, at least about 8 L, at least about 9 L, at least about 10 L, at least about 11 L, at least about 12 L, at least about 13 L, at least about 14 L, at least about 15 L, at least about 16 L, at least about 17 L, at least about 18 L, at least about 19 L, at least about 20 L, at least about 21 L, at least about 22 L, at least about 23 L, at least about 24 L, at least about 25 L, at least about 26 L, at least about 27 L, at least about 28 L, at least about 29 L, at least about 30 L, at least about 31 L, at least about 32 L, at least about 33 L, at least about 34 L, at least about 35 L, at least about 36 L, at least about 37 L, at least about 38 L, at least about 39 L, at least about 40 L, at least about 41 L, at least about 42 L, at least about 43 L, at least about 44 L, at least about 45 L, at least about 46 L, at least about 47 L, at least about 48 L, at least about 49 L, at least about 50 L, at least about 51 L, at least about 52 L, at least about 53 L, at least about 54 L, at least about 55 L, at least about 56 L, at least about 57 L, at least about 58 L, at least about 59 L, at least about 60 L, at least about 61 L, at least about 62 L, at least about 63 L, at least about 64 L, at least about 65 L, at least about 66 L, at least about 67 L, at least about 68 L, at least about 69 L, at least about 70 L, at least about 80 L, at least about 90 L, at least about 100 L, or more. Calculation of volume of solvent can be according to the dry weight or volume of the base material. Calculation of volume of solvent can be according to the wet weight or volume of the base material.

In some embodiments, salt water as a solvent. For example, salt water can be used as a solvent at a weight or volume of at least about 1% to less than about 100% of the weight or volume of the base material. As another example, salt water can be used as a solvent at a weight or volume of at least about 4% or less of the weight or volume of the base material for desired, necessary, or optimum strength and durability. As another example, salt water concentration can be at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 80%, or more.

Machine and Manual Installation and Formation

The materials described herein can be produced or installed manually or by machinery. Machines and manual tools for use in construction are well known in the art. For example, solvent application can be applied manually or by machinery. For example, compaction can be done manually or by machinery. For example, machinery can be a roller, vibratory roller, power harrow/tiller, spraying equipment, grader, recycler, meri-crusher, bowser, or grinder.

Example 1 describes the manual and machine-formation of roads and surfaces. Example 2 describes manual and machine-formation of construction materials.

Compacting the combination or mixture of stabilizing agent and base material can result in a reduction in volume. For example, compacting can result in a reduction in volume of at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or about 100%.

Grinders can reduce a base material into smaller sizes. Grinders can include roll crushers, rotary crushers, Hammermill, and Jaw crusher. For example, limestone, granite, trap rock, sandstone, basalt, diabase rock, gabbro, sand and gravel are a few examples of types of aggregates that can be size reduced for use in or as a base material. For example, grinding can result in aggregate reduction of at least about 100%, at least about 200%, at least about 300%, at least about 400%, at least about 500%, at least about 600%, at least about 700%, at least about 800%, at least about 900%, at least about 1,000% or more.

Colorant

As described herein, a colorant can be included in a surface (e.g., a traversable surface) or construction material. Colorants are commonly used in the paint, masonry, and construction fields and are commercially available. Colorant synthetic processes are well-known. Colorants are also known as pigments and pigment dispersions. Colorants can be natural or synthetic.

The colorant can be mixed with one or more colorants. The colorant can be combined with a stabilizing agent or a solvent (e.g., water) at about 2 to about 10% weight or volume for desired, necessary, or optimum color. For example, the colorant can be at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100% of weight or volume of the stabilizing agent or solvent. As another example, the colorant can be at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or less than about 100% of weight or volume of the resulting surface (e.g., a traversable surface) or construction material.

Colorants can include pigments, such as a fluorescence, phosphorescence, or luminescent pigment. Colorants can include a pigment having a high tinting strength relative to the materials it colors. Colorants can include a pigment stable in solid form at ambient temperatures. Colorants can include a permanent and or stable pigment. A colorant can include a fugitive (not permanent) pigment. A colorant can include a dry pigment or a fine powder pigment. A colorant can include a vehicle (or binder), a relatively neutral or colorless material that suspends the pigment and gives the paint its adhesion.

A colorant can include a pigment or a dye. A distinction is usually made between a pigment, which is insoluble in the vehicle (resulting in a suspension), and a dye, which either is itself a liquid or is soluble in its vehicle (resulting in a solution). A colorant can include a biological pigment, i.e., a colored substance independent of solubility. A colorant can include both a pigment and a dye depending on the vehicle it is used in. A colorant can include a pigment manufactured from a dye by precipitating a soluble dye with a metallic salt (e.g., a lake pigment).

A colorant can include a metallic or carbon pigments. A colorant can include cadmium pigments (e.g., cadmium yellow, cadmium red, cadmium green, cadmium orange); carbon pigments (e.g., carbon black, ivory black); chromium pigments (e.g., chrome yellow or chrome green); cobalt pigments (e.g., cobalt violet, cobalt blue, cerulean blue, aureolin (cobalt yellow)); copper pigments (e.g., Azurite, Han purple, Han blue, Egyptian blue, Malachite, Paris green, Phthalocyanine Blue BN, Phthalocyanine Green G, verdigris, viridian); iron oxide pigments (e.g., sanguine, caput mortuum, oxide red, red ochre, Venetian red, Prussian blue); clay earth pigments, i.e., iron oxides (e.g., yellow ochre, raw sienna, burnt sienna, raw umber, burnt umber); lead pigments (e.g., lead white, cremnitz white, Naples yellow, red lead); mercury pigments (e.g., vermilion); titanium pigments (e.g., titanium yellow, titanium beige, titanium white, titanium black); ultramarine pigments (e.g., ultramarine, ultramarine green shade); zinc pigments (e.g., zinc white, zinc ferrite); biological and organic pigments (e.g., alizarin (synthesized), alizarin crimson (synthesized), gamboge, cochineal red, rose madder, indigo, Indian yellow, Tyrian purple); and non-biological organic pigments (e.g., quinacridone, magenta, phthalo green, phthalo blue, pigment red 170).

Tracer

A tracer can be included in or along with the base material, stabilizing agent, or solvent, as described herein. Tracers are commonly used in the construction field and are commercially available.

A tracer can be incorporated into a surface (e.g., a traversable surface) or construction material, as those materials are described herein. Such tracer can allow, manufacturers, engineers, or authorities to empirically assess quality and quantity of an installation. A tracer can be incorporated at any step in the manufacturing process. For example, the tracer can be incorporated directly into the stabilizing agent or component thereof. For example, the tracer can be incorporated directly into stabilizing agent. For example, a tracer can be added to the stabilizing agent prior to distribution (e.g., to ensure the material is being used properly). The tracer-laced material ca be used in the construction of a road or structure. A sample of the road or structure can be examined by an independent lab to determine if the installation meets certain standards or requirements. For example, introduction of an acid (e.g., $H_2SO_4$, HCl, $HNO_3$) will dissolve the sample and the tracer can be detected. For example, a tracer can be UV materials.

A tracer can be combined with the stabilizing agent. A tracer can be combined with the solvent. A trace can be added to the stabilizing agent or solvent in a detectable amount. A tracer can be present at about 0.01% to about 50% weight or volume of a surface (e.g., a traversable surface) or construction material. For example, in surface (e.g., a traversable surface) or construction material, a tracer can be (by weight or volume) at least about 0.01%, at least about 0.05%, at least about 0.1%, at least about 0.5%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, or more.

Kits

Also provided are kits. Such kits can include an stabilizing agent, colorant, or tracer as described herein and, in certain embodiments, instructions for installation. Such kits can facilitate performance of the methods described herein. When supplied as a kit, the different components of the composition can be packaged in separate containers and admixed immediately before use. Components include, but are not limited to a stabilizing agent, a concentrated solution of stabilizing agent, solvent, water, or colorant. Such packaging of the components separately can, if desired, be presented in a pack or dispenser device which may contain one or more unit dosage forms containing the composition. The pack may, for example, comprise metal or plastic foil such as a blister pack. Such packaging of the components separately can also, in certain instances, permit long-term storage without losing activity of the components.

Kits may also include solutions in separate containers such as, for example, colorant and stabilizing agent packaged separately. Packaging may consist of any suitable material, such as glass, organic polymers, such as polycarbonate, polystyrene, ceramic, metal or any other material typically employed to hold reagents. Other examples of suitable containers include bottles that may be fabricated from similar substances as ampules, and envelopes that may consist of foil-lined interiors, such as aluminum or an alloy. Other containers include test tubes, vials, flasks, bottles, syringes, and the like. Other containers may have two compartments that are separated by a readily removable membrane that upon removal permits the components to mix. Removable membranes may be glass, plastic, rubber, and the like.

In certain embodiments, kits can be supplied with instructional materials. Instructions may be printed on paper or other substrate, and/or may be supplied as an electronic-readable medium, such as a floppy disc, mini-CD-ROM, CD-ROM, DVD-ROM, Zip disc, videotape, audio tape, and the like. Detailed instructions may not be physically associated with the kit; instead, a user may be directed to an Internet web site specified by the manufacturer or distributor of the kit.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are openended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1

Road with Water Resistance

The following example describes the preparation of a road with water resistant characteristics.

Preliminary assessment of the areas where the road is desired include checking the geology, topography, levels, gradients/drainage, water levels during rainy seasons; ensure the foundation is stable (e.g., not subject to wash over/under or standing water; has adequate or functional drainage, stones no larger than about 20% of the stabilized layer depth, no major tree roots under or protruding surface). Tests recommended to be performed include a penetrometer test, soil core sample test (for soil analysis and decaying vegetation), topographical leveling for any re-grading/re-profiling/re-leveling, soil grading and sieve analysis (to determine that the fines are about 30-35% or more, measured through a −200 sieve 0.63-0.7 mm).

The road is prepared to a required length×depth×width. Organic growth (e.g., roots, moss, grass) are removed from the top surface of the area to be resurfaced. The area can be the top surface of the base material (e.g., local soil, in situ material). The surface is graded to a specified length width and depth required for a specified usage and traffic weight (see e.g., FIG. 1A). The base-layer can be about 50 mm for pathways, about 15-20 cm depth can support a 40 ton truck, about 25 cm are for all other applications. For base-layers about 25 cm, two 12.5 cm layers should be installed. Generally, there should be about 30-35% of fines and no stone larger than about 20% of the layer depth for optimum strength and durability.

A stabilizing agent is applied. Here, a styrene acrylic polymer (AggreBind©, UK) was used as the stabilizing agent. The styrene acrylic polymer-based material obtained from AggreBind©, was diluted with water as the solvent in a ratio of about 1 part AggreBind© to about 4 parts water.

Figure 2:
FIG. 2 is a photograph of various color options available for the roads or construction materials (e.g., red, green, yellow, blue).

A water-based colorant (Northwest Dispersions, Inc., UK) (see e.g., FIG. 2) can be blended into the stabilizing polymer with machinery or manually. The proportion of water-based colorant to polymer is about 2%-10% of the total volume of polymer solution. The amount will depend on the color, chosen colorant, and the desired color density. The resulting bended combination is a colored stabilizing agent.

The optimum moisture content for the conditions for the base material to be stabilized (e.g., soil) are determined with consideration of the ambient temperature and relative humidity, then water can be added as needed for disbursement of the colored stabilizing polymer over the prepared road area comprising the base material. Optimum moisture content will depend on the type of soil stabilized polymer used. The soils stabilized polymer used herein was a styrene acrylic polymer (AggreBind©, UK). A simple test to determine the Optimum moisture content can be performed after spraying the blend of soil with AggreBind©, the treated soil is squeezed firmly in hand. If the soil binds together with no moisture leaching through fingers, then the treated layer is ready for compaction. If the treated layer starts to dry out, the treated layer must be sprayed again.

The stabilizing agent used here has shown enhanced stability and durability at about 4 liters concentrate into 1 cubic meter of mass. Because the concentrate was diluted at least 4 parts water with 1 part AggreBind©, about 20 L to 48 L per cubic meter was used depending on the dryness of the soil.

After the disbursement of the colored stabilizing polymer, the prepared area is blended. The stabilizing agent can be installed manually (see e.g., FIG. 1B) or with common road building/agricultural machinery, such as a bowser (see e.g., FIG. 3A).

A tracer can be incorporated. At any step in the process a tracer can be incorporated into the stabilizing agent or material to allow, manufacturers, engineers, and authorities to empirically assess quality and quantity of any installation. The tracer can be incorporated directly into the stabilizing agent or component thereof. Here, the tracer is incorporated directly into stabilizing agent.

Figure 4:
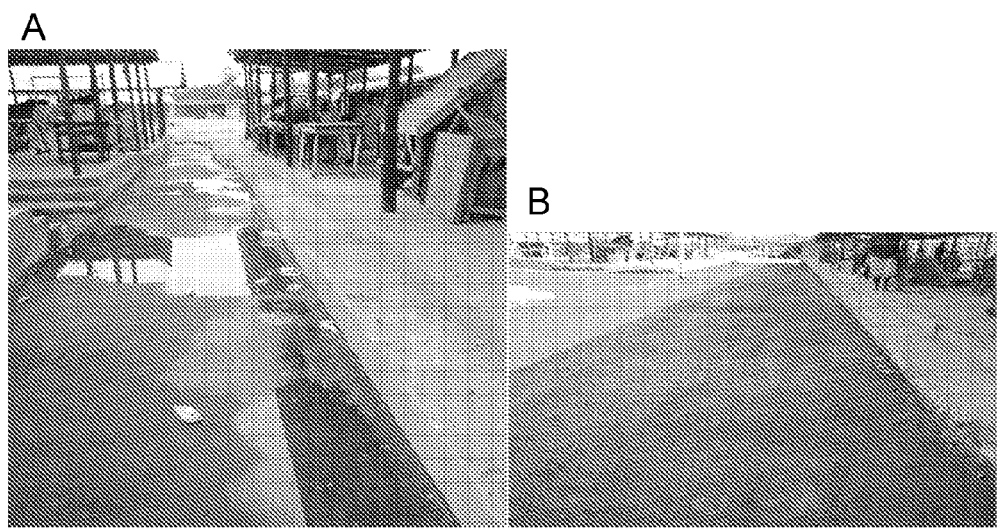
FIG. 4A is a photograph of a finished cured road after a heavy rain showing water resistance. The rain water does not absorb into the road.
FIG. 4B shows a finished cured road in the black color option.

If needed, the area can be re-graded, and compacted (see e.g., FIG. 3B). The road can be seal-coated or top-coated (see e.g., FIG. 1C). The polymer blended in the material imparts water resistant characteristics. A polymer seal coating or polymer top coating imparts enhanced water resistant characteristics (see e.g., FIG. 4A). After the top coating is applying rolling with no vibration can be applied.

The result is a colored or non-colored road made from in situ materials (see e.g., FIG. 1C). If colored, the color of the road is consistent throughout the entire surface and depth of the road (see e.g., FIG. 4B, black colorant).

Any surface can be applied to the surface of a road installed as described above. Such surfaces include asphalt or concrete for specialty applications such as airports (e.g., landing strips), factory roads, or arterial roads. A polymer impregnated stone chippings can be added to the surface prior to the final compaction or rolling stage to provide a non-slip surface. Bitumen stone can be installed into the surface as a wearing surface. The roads can be painted to make driving safer. The road shoulder can be sealed to prevent surface water from penetrating the edge and draining ditches can be installed.

The road can be opened to traffic within two hours of installation and withstand full wheel loads of aircraft, helicopter and heavy equipment depending on depth. Full curing completes in about 28 days. Repair of the roads can be done easily. The stabilizing agent has a unique bond-back capability that ensures that damaged areas bond naturally to a previously treated area. Moreover the repaired area will attain the same strength as the previously treated original areas. Potholes can be repaired by spraying the stabilizing agent into the pot hole then the hole is filled with treated soil. The treated soil s compacted and the surface is oversprayed, with additional overspray beyond the edge of the repair.

Example 2

Construction Materials with Water Resistance

The following example describes the preparation of a construction materials including blocks, bricks, pavers, free standing blocks, and other surfaces with water resistant characteristics.

The length, width, and height of the blocks bricks, pavers, and other surfaces (e.g., decorative surfaces, building materials) are determined. Organic matter (e.g., roots, moss, and grass) are removed from the base material. The base material (e.g., soil, materials, recycled materials, in situ materials) is to be evaluated to prepare the construction materials.

In this example, the fines content (granular material passing through a sieve of about 0.7 mm) of the base material is about 35% or more, for a high-quality construction material.

A stabilizing agent is applied. Here, a styrene acrylic polymer (AggreBind©, UK) was used as the stabilizing agent. The styrene acrylic polymer-based material obtained from AggreBind©, was diluted with water as the solvent in a ratio of about 1 AggreBind© to about 4 water.

Figure 5:
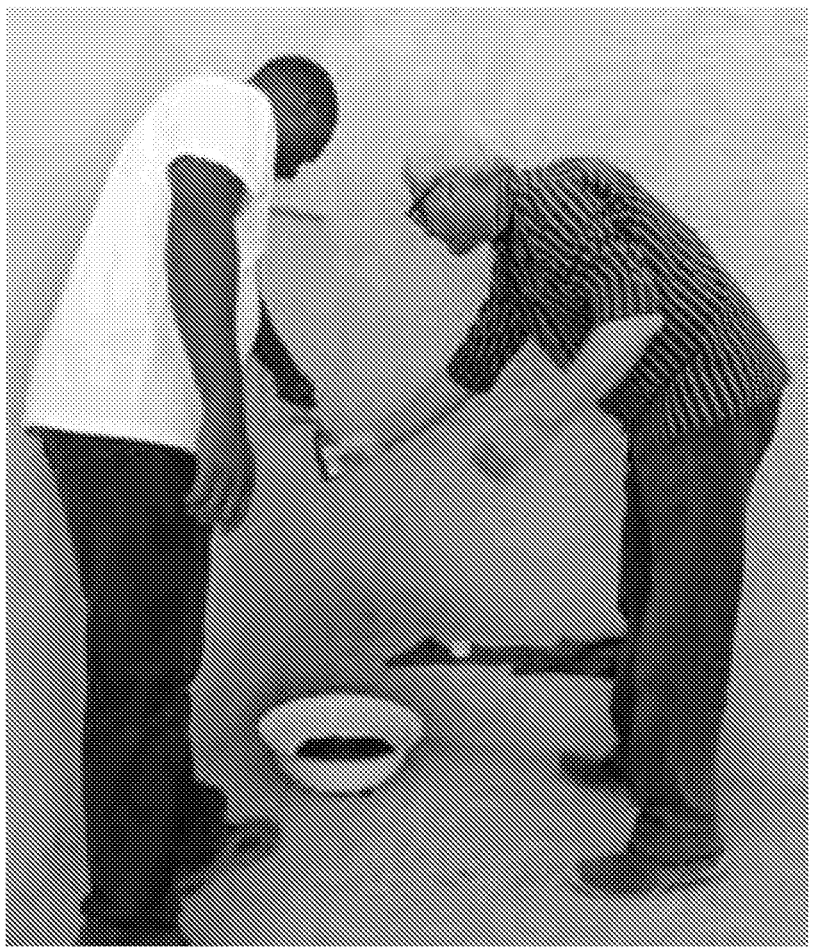
FIG. 5 is a photograph of the mixing of the colorant and stabilizing agent. The colorant was mixed into the stabilizing agent at about 2-10%.

A water-based colorant (Northwest Dispersions, Ltd, UK) (see e.g., FIG. 2) is blended with the stabilizing agent (see e.g., FIG. 5). The proportion of water-based colorant to polymer is about 2%-10% of the total volume of polymer solution. The amount will depend on the color, chosen colorant, and the desired color density. The resulting blended combination is a colored stabilizing agent.

The optimum moisture content for the conditions for the material to be stabilized (e.g., soil) are determined with consideration of the ambient temperature and relative humidity, then water can be added as needed for disbursement of the colored stabilizing polymer throughout the base material. Optimum moisture content will depend on the type of soil stabilized polymer used. The soils stabilized polymer used herein was a styrene acrylic polymer (AggreBind©, UK). The stabilizing polymer can have an optimum moisture content of about 4 liters concentrate into 1 cubic meter of mass. The colorant can be omitted if the natural color of the material is desirable. A simple test to determine the Optimum moisture content can be performed after spraying the blend of soil with AggreBind©, the treated soil is squeezed firmly in hand. If the soil binds together with no moisture leaching through fingers, then the treated layer is ready for compaction. If the treated layer starts to dry out, the treated layer must be sprayed again.

Figure 6:
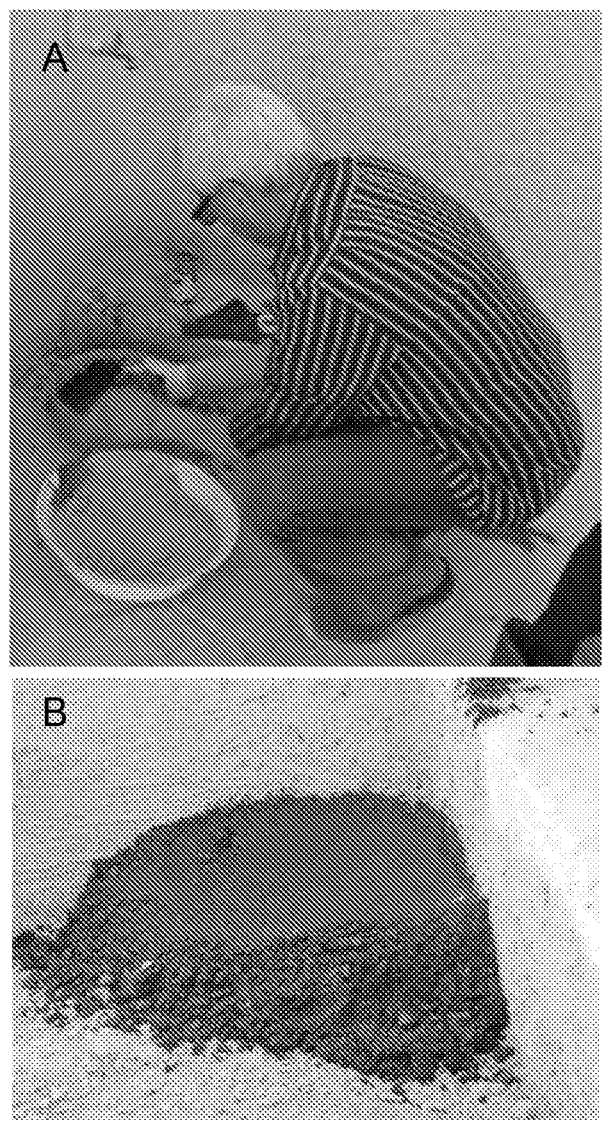
FIG. 6A is a photograph of the combination of the stabilizing agent/colorant blend with an in situ base material. Water is added for optimum moisture content.
FIG. 6B is a photograph of the resulting mixture of the stabilizing agent, colorant, and in situ base material compacted into a corner.
Figure 7:
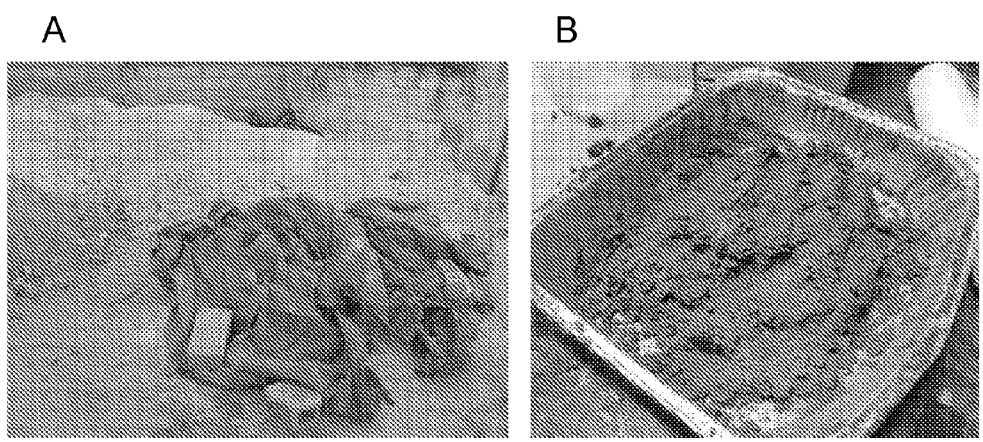
FIG. 7A is a photograph of in situ material.
FIG. 7B is a photograph of the blend of in situ material, the stabilizing agent, and added water for optimum moisture content.
Figure 8:
FIG. 8 is a photograph of construction materials produced by simple machinery.
Figure 9:
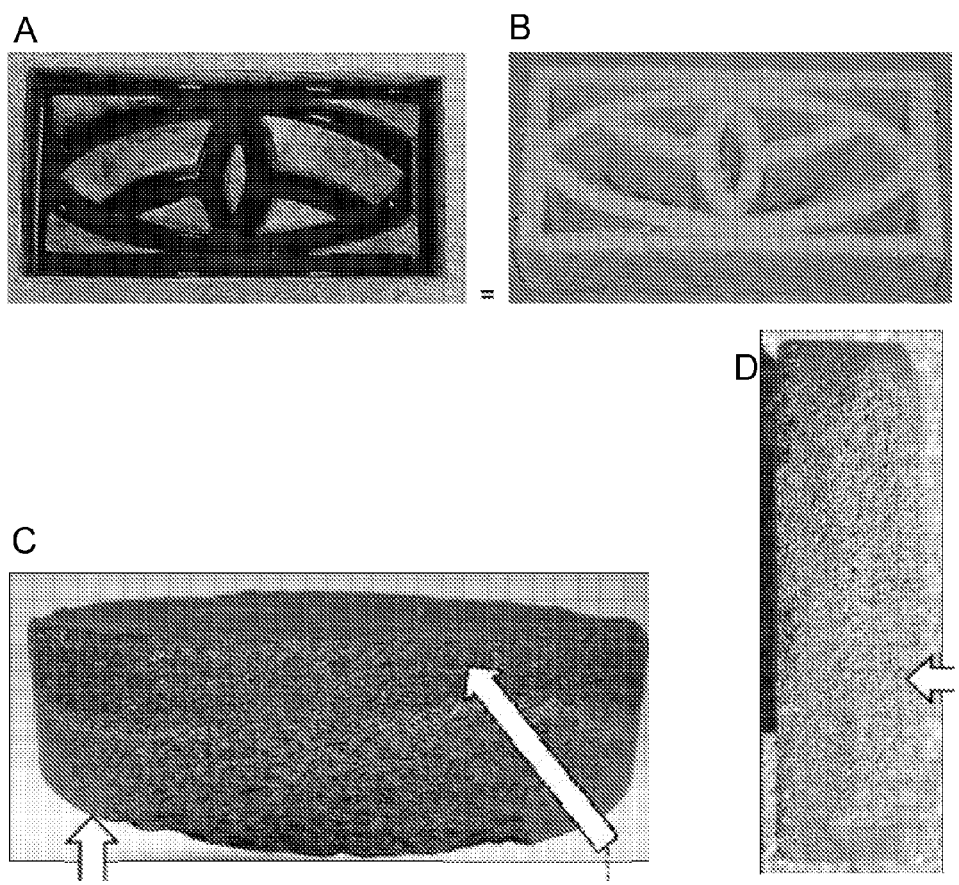
FIG. 9A is a photograph of a mould.
FIG. 9B is a photograph of the resulting structure made from placing the mixture of base material, stabilizing agent, and water into the mould, compressing, and allowing to cure.
FIG. 9C is a photograph of a colored construction material made from 100% desert sand with a colored top seal. The colored top seal is shown to penetrate into the constriction material.
FIG. 9D is a photograph of a colored construction materials made from 100% sand with a colored top seal, cut through to show the color is blended throughout the construction material. The colored top seal is shown to penetrate into the constriction material.
Figure 10:
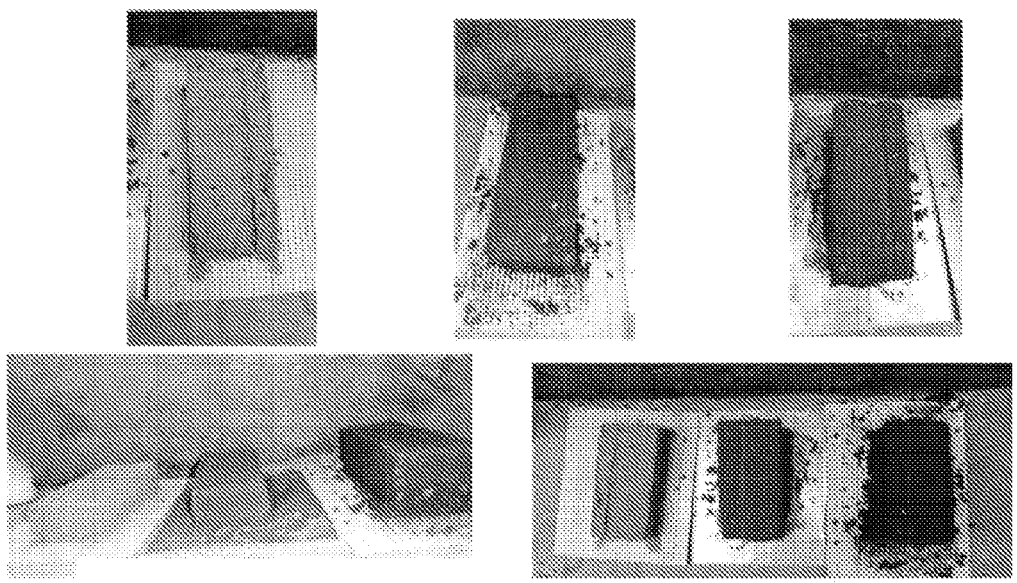
FIG. 10 is a photograph of automated machinery-made construction materials with and without colorant added.

The construction material can be prepared by blending the stabilizing agent (optionally colored) and the base material (see e.g., FIG. 7A) in an appropriate receptacle (see e.g., FIG. 6A, FIG. 7B). The resulting base material and stabilizing agent composition can be poured in a desired area (see e.g., FIG. 6B) or poured into an automated machine, rudimentary machine, or hand-made moulds for compaction or compacted in a separate step (see e.g., FIG. 8, FIG. 9A-D). Alternatively, the base material can be blended in an automated machine, rudimentary machine, or hand-made moulds for compaction or compacted is a separate step. The compacted mixture can be dried (e.g., kiln dried, air dried). Air-dried construction materials can be dried for about 28 days in a covered area. The construction materials can be handled in about 7 days. For enhanced water-resistant properties, a seal coat or top seal of stabilizing agent (with or without colorant) can be used (see e.g., FIG. 9C-D). Because the stabilizing agent is blended throughout the construction material, the construction material possesses enhanced longevity. Test have indicated the material is to last at least indefinitely and guaranteed for 10 years. Because the colorant can be uniform throughout (see e.g., FIG. 10), the construction material can be cut to size and retain the same color on the cut edge as the surface (see e.g., FIG. 10). The method resulted in non-fired clay construction materials that meet or exceed internationally recognized strength standards.

A tracer can be incorporated. At any step in the process a tracer can be incorporated into the stabilizing agent or material to allow, manufacturers, engineers, and authorities to empirically assess quality and quantity of any installation. The tracer can be incorporated directly into the stabilizing agent or component thereof. Here, the tracer is incorporated directly into stabilizing agent.

Example 3

Roads and Construction Materials from Waste Materials

The following example describes the preparation of optionally colored roads and construction materials including blocks, bricks, pavers, free standing blocks, and other surfaces with water resistant characteristics using waste materials.

Figure 11:
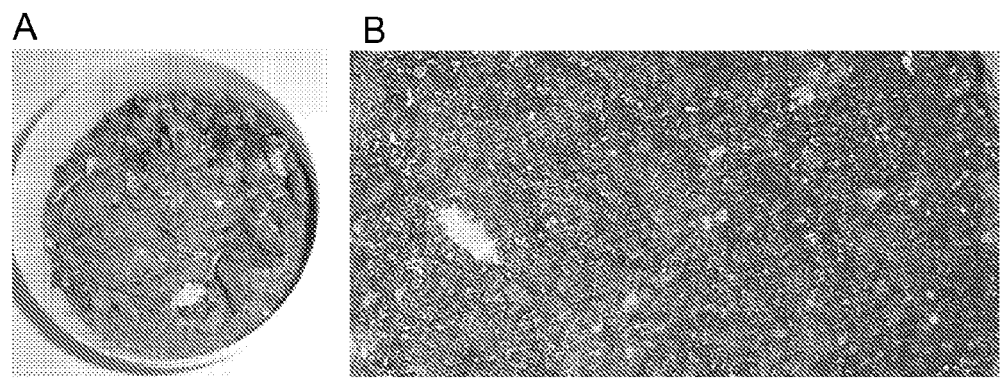
FIG. 11A is a photograph of recycled waste material.
FIG. 11B is a photograph of the waste material as 35% recycled waste material combined with 65% base material.
Figure 12:
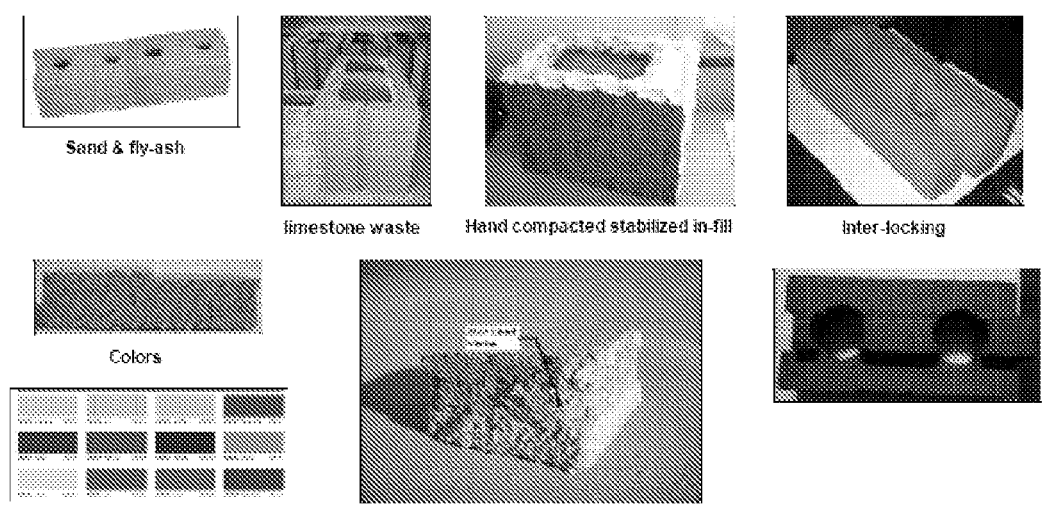
FIG. 12 are photographs of examples of construction materials made with about 35% fines content base material, fines material passing through a 0.63 mm sieve; no stone larger than about 20% of the minimum depth of final cured material; removed organic materials, and on-site or local materials and waste materials.

Adding up to about 35% waste material to the total volume of the base material. As described in Example 1 and Example 2, the base material is blended with the optionally colored stabilizing agent. Up to about 35% waste material can be added to the blend of base material and soils stabilizing polymer and blended. The waste material can be pulverized (see e.g., FIG. 11A) prior to adding to the blend of base material and stabilizing agent (see e.g., FIG. 11B). The blending, compacting, and sealing can be completed as described in Example 1 and Example 2 resulting in construction materials using waste materials (see e.g., FIG. 12).

A tracer can be incorporated. At any step in the process a tracer can be incorporated into the stabilizing agent or material to allow, manufacturers, engineers, and authorities to empirically assess quality and quantity of any installation. The tracer can be incorporated directly into the stabilizing agent or component thereof. Here, the tracer is incorporated directly into stabilizing agent.

The invention claimed is:
1. A method of forming a surface or construction material comprising the steps of:
   obtaining a stabilizing agent;
   obtaining a base material;
   obtaining a solvent;
   combining the stabilizing agent, base material, and solvent to form a mixture; and
   compacting the mixture to form a surface or compacting the mixture to form a construction material;
   wherein
      the stabilizing agent comprises a polymer;
      the base material comprises soil, sand, silt, clay, loam, rock, gravel, or organic matter;
      the solvent comprises a water-based solvent, water, mud, recycled water, gray water, salt water, fresh water, purified water, fresh water, sea water, or brackish water; and
      the polymer comprises a styrene acrylic copolymer; and
      the surface or construction material does not comprise an asphalt emulsion, tire, or recycled asphalt.
2. A composition comprising:
(i) a stabilizing agent, a base material, and a solvent; or
(ii) a cured stabilizing agent and a base material;
wherein
   the stabilizing agent comprises a polymer;
   the base material comprises soil, sand, silt, clay, loam, rock, gravel, or organic matter;
   the solvent comprises a water-based solvent, water, mud, recycled water, gray water, salt water, fresh water, purified water, fresh water, sea water, or brackish water; and
   the polymer comprises a styrene acrylic copolymer;
   the composition does not comprise an asphalt emulsion, tire, or recycled asphalt; and
   the stabilizing agent and base material are uniformly mixed throughout the composition.
3. The method of claim 1, wherein
the surface or construction material comprises a (i) a traversable surface or (ii) a road, lining, way, path, route, street, pathway, track, roadway, or walkway.
4. The method of claim 1, wherein compacting the mixture is performed mechanically or manually.
5. The method of claim 1, wherein the polymer is combined with the solvent, or a portion thereof, prior to combination with the base material.
6. The method of claim 1, wherein the construction material comprises
   a block, brick, paver, decorative surface, or tile; or
   a colorant.
7. The method of claim 1, wherein
compaction comprises mechanical compaction or manual compaction or
compaction of the mixture into a mold comprises mechanical compaction or manual compaction.
8. The method of claim 1, further comprising
curing the compacted mixture,
wherein curing the compacted mixture comprises drying the material.
9. The method of claim 1, wherein the base material comprises from about 30% to about 35% fines material, the fines material passing through a sieve between 0.6 mm and 0.7 mm.
10. The composition of claim 2, wherein the base material comprises from about 30 to about 35% fines material, the fines material passing through a sieve between 0.6 mm and 0.7 mm.
11. The method of claim 7, further comprising drying the molded construction material.
12. The method of claim 1 wherein the construction material comprises a tracer.
13. The composition of claim 2, wherein the composition comprises a tracer.
14. The composition of claim 2, wherein the composition is water-resistant.
15. The method of claim 1, further comprising a waste material.
16. The composition of claim 2, further comprising a waste material.
17. The method of claim 15, wherein the waste material is a hazardous material.
18. The composition of claim 16, wherein the waste material is a hazardous material.
19. The method of claim 15, wherein the waste material comprises inorganic waste, organic waste, recycled material, recycled cement, nut shells, peat, organic material, fly ash, oil impregnated sand, tar sand, construction waste, mine waste, roofing shingles, plastic, crushed glass, fiber glass, rubber crumb, non-organic municipal waste, material found in polluted areas, or materials from lag storage tanks.
20. The composition of claim 16, wherein the waste material comprises inorganic waste, organic waste, recycled material, recycled cement, nut shells, peat, organic material, fly ash, oil impregnated sand, tar sand, construction waste, mine waste, roofing shingles, plastic, crushed glass, fiber glass, rubber crumb, non-organic municipal waste, material found in polluted areas, or materials from lag storage tanks.
21. The composition of claim 1, wherein the composition is water-resistant.

* * * * *

UNITED STATES PATENT AND TRADEMARK OFFICE
CERTIFICATE OF CORRECTION

PATENT NO. : 9,260,822 B2
APPLICATION NO. : 14/124760
DATED : February 16, 2016
INVENTOR(S) : Robert D. Friedman et al.

It is certified that error appears in the above-identified patent and that said Letters Patent is hereby corrected as shown below:

Claims

In column 23, lines 16 and 17, Claim 1 and lines 30 and 31, Claim 2, the second mention of fresh water should be removed.

From: "salt water, fresh water, purified water, fresh water, sea water"

To: --salt water, fresh water, purified water, sea water--

In column 24, lines 48 and 49, Claim 21, should be updated from a composition claim to a method claim.

From: "The composition of claim 1, wherein the composition is water-resistant."

To: --The method of claim 1, wherein the composition is water-resistant.--

Signed and Sealed this
Twelfth Day of July, 2016

Michelle K. Lee
*Director of the United States Patent and Trademark Office*